US009325184B2

(12) United States Patent
Lenive et al.

(10) Patent No.: US 9,325,184 B2
(45) Date of Patent: Apr. 26, 2016

(54) APPARATUS FOR WIRELESSLY CHARGING A RECHARGEABLE BATTERY

(71) Applicant: QUALCOMM TECHNOLOGIES INTERNATIONAL, LTD., Cambridge, Cambridgeshire (GB)

(72) Inventors: Vlad Lenive, Cambridge (GB); Paul Morris, Cambridge (GB)

(73) Assignee: Qualcomm Technologies International, Ltd., Cambridge (GB)

( * ) Notice: Subject to any disclaimer, the term of this patent is extended or adjusted under 35 U.S.C. 154(b) by 179 days.

(21) Appl. No.: 14/134,202

(22) Filed: Dec. 19, 2013

(65) Prior Publication Data
US 2015/0180251 A1 Jun. 25, 2015

(51) Int. Cl.
*H02J 7/00* (2006.01)
*B81B 7/00* (2006.01)
*H02J 17/00* (2006.01)
*H02J 7/02* (2006.01)

(52) U.S. Cl.
CPC ............... *H02J 7/0042* (2013.01); *B81B 7/008* (2013.01); *H02J 7/0052* (2013.01); *H02J 17/00* (2013.01); *B81B 2201/01* (2013.01); *H02J 7/025* (2013.01)

(58) Field of Classification Search
CPC ....... H02J 7/025; H02J 7/0042; H02J 7/0052; B81B 7/008
USPC .......................................... 320/108; 307/104
See application file for complete search history.

(56) References Cited

U.S. PATENT DOCUMENTS

| | | | | |
|---|---|---|---|---|
| 6,777,684 | B1 * | 8/2004 | Volkov et al. ............... | 250/341.1 |
| 7,245,269 | B2 * | 7/2007 | Sievenpiper ......... | H01Q 19/104 |
| | | | | 343/700 MS |
| 7,421,321 | B2 * | 9/2008 | Breed et al. .................. | 701/33.6 |
| 7,463,116 | B2 * | 12/2008 | Naniwada ..................... | 333/186 |
| 7,526,266 | B2 | 4/2009 | Al-Mahdawi | |
| 7,830,330 | B2 * | 11/2010 | Pelzer ...................... | H01Q 1/22 |
| | | | | 343/700 MS |
| 8,018,375 | B1 * | 9/2011 | Alexopoulos .......... | H01Q 19/10 |
| | | | | 342/175 |
| 8,233,872 | B2 | 7/2012 | Nagai et al. | |
| 8,285,214 | B2 | 10/2012 | Sadeghfam et al. | |
| 8,351,850 | B2 | 1/2013 | Van Aken et al. | |
| 8,570,223 | B2 * | 10/2013 | Arslan ..................... | H01Q 1/38 |
| | | | | 343/700 MS |

(Continued)

FOREIGN PATENT DOCUMENTS

CN 202651905 U 1/2013
DE 102012012099 A1 12/2012
(Continued)

OTHER PUBLICATIONS

Search Report issued by United Kingdom Intellectual Property Office for Application No. GB 1412220.4 on Jun. 5, 2015.

*Primary Examiner* — M'Baye Diao
(74) *Attorney, Agent, or Firm* — Procopio Cory Hargreaves & Savitch LLP (57) ABSTRACT

The present application relates to apparatus for wirelessly charging a rechargeable battery, the apparatus comprising: a charging resonator assembly for converting energy from a magnetic field external to the apparatus into an electric current; and a charging circuit for charging the battery using the electric current, wherein the charging resonator assembly includes a plurality of microelectromechanical system (MEMS) switches which, when open, divide the charging resonator into a plurality of electrically unconnected resonator portions, and which, when closed, connect the plurality of resonator portions to form a continuous resonator.

10 Claims, 5 Drawing Sheets

(56) References Cited

U.S. PATENT DOCUMENTS

| | | | |
|---|---|---|---|
| 8,598,747 B2 * | 12/2013 | Bilbrey et al. | 307/104 |
| 8,606,212 B2 | 12/2013 | Sheikholeslami | |
| 8,796,886 B2 * | 8/2014 | Tan | 307/104 |
| 8,797,230 B2 * | 8/2014 | Leisten | H01Q 1/38 343/700 MS |
| 9,086,864 B2 * | 7/2015 | Culbert et al. | |
| 2002/0080088 A1 * | 6/2002 | Boyle | H01Q 1/243 343/895 |
| 2003/0054788 A1 | 3/2003 | Sugar et al. | |
| 2005/0096000 A1 | 5/2005 | Petrovic et al. | |
| 2006/0098765 A1 | 5/2006 | Thomas et al. | |
| 2006/0158165 A1 | 7/2006 | Inn et al. | |
| 2009/0075591 A1 | 3/2009 | Murdoch et al. | |
| 2009/0278685 A1 | 11/2009 | Potyrailo et al. | |
| 2009/0295344 A1 | 12/2009 | Qu | |
| 2010/0002803 A1 | 1/2010 | Murdoch et al. | |
| 2010/0054350 A1 | 3/2010 | Kojima | |
| 2012/0032862 A1 * | 2/2012 | Ying | H01Q 1/243 343/749 |
| 2012/0105029 A1 | 5/2012 | Kawagoe | |
| 2012/0322399 A1 | 12/2012 | Sheikholeslami | |
| 2013/0003892 A1 | 1/2013 | McFarthing | |
| 2013/0017782 A1 | 1/2013 | Tay et al. | |
| 2013/0021012 A1 | 1/2013 | Oddoart et al. | |
| 2013/0176177 A1 | 7/2013 | Cetiner et al. | |
| 2014/0015729 A1 | 1/2014 | Uejima et al. | |
| 2014/0306855 A1 | 10/2014 | Tsai et al. | |

FOREIGN PATENT DOCUMENTS

| | | |
|---|---|---|
| DE | 102012013632 A1 | 1/2013 |
| DE | 102012013120 A1 | 3/2013 |
| EP | 0515187 A3 | 11/1992 |
| EP | 1 580 841 A1 | 9/2005 |
| EP | 2221984 A1 | 8/2010 |
| GB | 2428940 A | 2/2007 |
| GB | 2484103 A | 4/2012 |
| GB | 2491883 A | 12/2012 |
| GB | 2492362 A | 1/2013 |
| GB | 2493000 A | 1/2013 |
| GB | 2497775 A | 1/2013 |
| JP | 2006-115451 A | 4/2006 |
| WO | WO 2006/076669 A1 | 7/2006 |
| WO | WO 2006/088583 A2 | 8/2006 |
| WO | WO 2009/128032 A1 | 10/2009 |
| WO | WO 2010/041173 A1 | 4/2010 |
| WO | WO 2013/141718 A1 | 9/2013 |

* cited by examiner

APPARATUS FOR WIRELESSLY CHARGING A RECHARGEABLE BATTERY

TECHNICAL FIELD

The present application relates to an apparatus for wirelessly charging a rechargeable battery.

BACKGROUND TO THE INVENTION

There is increasing interest in the field of wireless charging for battery powered portable devices such as mobile telephones, tablet computers and the like. Devices capable of wireless charging need not be physically connected to a source of charging current such as a mains powered charger. Instead, such devices can simply be placed on a wireless charger, which wirelessly provides charging energy to the device, typically by inductive coupling.

In wireless charging systems, there is an ever-present possibility of incurring damage to a target device (i.e. a device being charged wirelessly) if the power being supplied by the wireless charger is too great, or is applied for too long.

To combat this risk, passive detuning or reconfiguration of the target device's antenna has been proposed. Under this proposed scheme, a passive component in an antenna filter of the target device reacts automatically to a risk condition such as excessive charging power to de-tune the antenna, thereby reducing the coupling between the charger antenna and the target device antenna, with the aim of reducing the power entering the device. For example, the target device may include a thermistor positioned close to the device battery. As the battery temperature increases the resistance of the thermistor changes, such that if the temperature of the battery becomes too high the antenna is de-tuned or re-configured automatically.

An alternative is simply to disconnect the target device's antenna from the other components in the target device if the power being supplied by the wireless charger is too great, or is applied for too long. Under this proposed scheme, one or more transistors connects the antenna to the other components in the target device (e.g. one or more transistors may connect the antenna to the antenna filter), and in the event of a risk condition such as excessive charging power as detected, for example, using a thermistor positioned in close proximity to the battery of the target device, the one or more transistors are switched off, thereby disconnecting the antenna from the antenna filter and other downstream components of the device.

One potential problem with the proposed approached is that, even when the antenna is detuned or disconnected, significant power is being supplied by the charger. If the antenna is detuned to the point that it can be regarded as being open circuit, or disconnected, a potentially damaging large voltage can develop across it, or potentially damaging high currents may develop in the antenna. In either case, in order to mitigate the risk of damage to the target device due to these high voltages or currents, high power transistors must be used to disconnect the antenna from the rest of the target device. The use of such high power transistors adds significantly to the bill of materials cost of the target device, however.

Accordingly, a need exists for some means of reducing the risk of damage to a target device due to high current or voltage levels that may develop in the target device when passive detuning or reconfiguration systems or antenna switching systems are used to protect the target device from risk conditions such as overcharging.

SUMMARY OF INVENTION

According to a first aspect of the invention there is provided apparatus for wirelessly charging a rechargeable battery, the apparatus comprising: a charging resonator assembly for converting energy from a magnetic field external to the apparatus into an electric current; and a charging circuit for charging the battery using the electric current, wherein the charging resonator assembly includes a plurality of microelectromechanical system (MEMS) switches which, when open, divide the charging resonator into a plurality of electrically unconnected resonator portions, and which, when closed, connect the plurality of resonator portions to form a continuous resonator.

The use of a plurality of MEMS switches in the resonator assembly gives rise to a number of advantages over prior art systems. The MEMS switches allow the charging resonator to be detuned or disconnected from the charging circuit safely, as the MEMS switches are able to cope safely with currents induced in the charging resonator when it is disconnected or detuned, thus obviating the need for costly high power transistors. Moreover, the use of the plurality of MEMS switches to divide the charging resonator into a plurality of electrically unconnected resonator portions reduces the amount of current that can be induced in any one individual resonator portion to a level that can be safely managed.

The charging resonator assembly may include a plurality of individual resonators, and each resonator may include a plurality of microelectromechanical system (MEMS) switches which, when open, divide the individual resonator into a plurality of electrically unconnected resonator portions, and which, when closed, connect the plurality of resonator portions to form a continuous resonator.

The plurality of MEMS switches in each individual resonator in a multi-resonator assembly helps to reduce the effects of parasitic coupling between the individual resonators of the resonator assembly.

One of the plurality of MEMS switches of each individual resonator may be operative to selectively connect the individual resonator to the charging circuit.

The apparatus may further comprise: a resonator matching circuit configured to tune the charging resonator assembly to a desired frequency, wherein the resonator matching circuit includes a MEMS switch for selectively connecting a tuning component of the resonator matching circuit to tune the charging resonator assembly to the desired frequency.

For example, the resonator matching circuit may comprise a series resonant circuit including a plurality of MEMS switches for selecting one or more of a plurality of tuning components.

Alternatively, the resonator matching circuit may comprise a parallel resonant circuit including a plurality of MEMS switches for selecting one or more of a plurality of tuning components.

The tuning component may comprise a capacitance.

The charging resonator assembly may comprise a reconfigurable resonator, wherein the reconfigurable resonator comprises: a plurality of tracks of electrically conductive material, the plurality of tracks being electrically isolated from each other; and a plurality of microelectromechanical system (MEMS) switches, wherein individual ones of the plurality of MEMS switches can be actuated to make electrical connections between selected ones of the plurality of tracks, such that the selected tracks and the actuated MEMS switches form a single electrically conductive element.

The plurality of tracks may be arranged in a grid or matrix configuration.

The grid or matrix configuration may be generally polygonal.

According to a second aspect of the invention there is provided a reconfigurable antenna comprising: a plurality of tracks of electrically conductive material, the plurality of tracks being electrically isolated from each other; and a plurality of microelectromechanical system (MEMS) switches, wherein individual ones of the plurality of MEMS switches can be actuated to make electrical connections between selected ones of the plurality of tracks, such that the selected tracks and the actuated MEMS switches form a single electrically conductive element.

The plurality of tracks may be arranged in a grid or matrix configuration.

The grid or matrix configuration may be generally polygonal.

BRIEF DESCRIPTION OF THE DRAWINGS

Embodiments of the invention will now be described, strictly by way of example only, with reference to the accompanying drawings, of which

DESCRIPTION OF THE EMBODIMENTS

Figure 1:
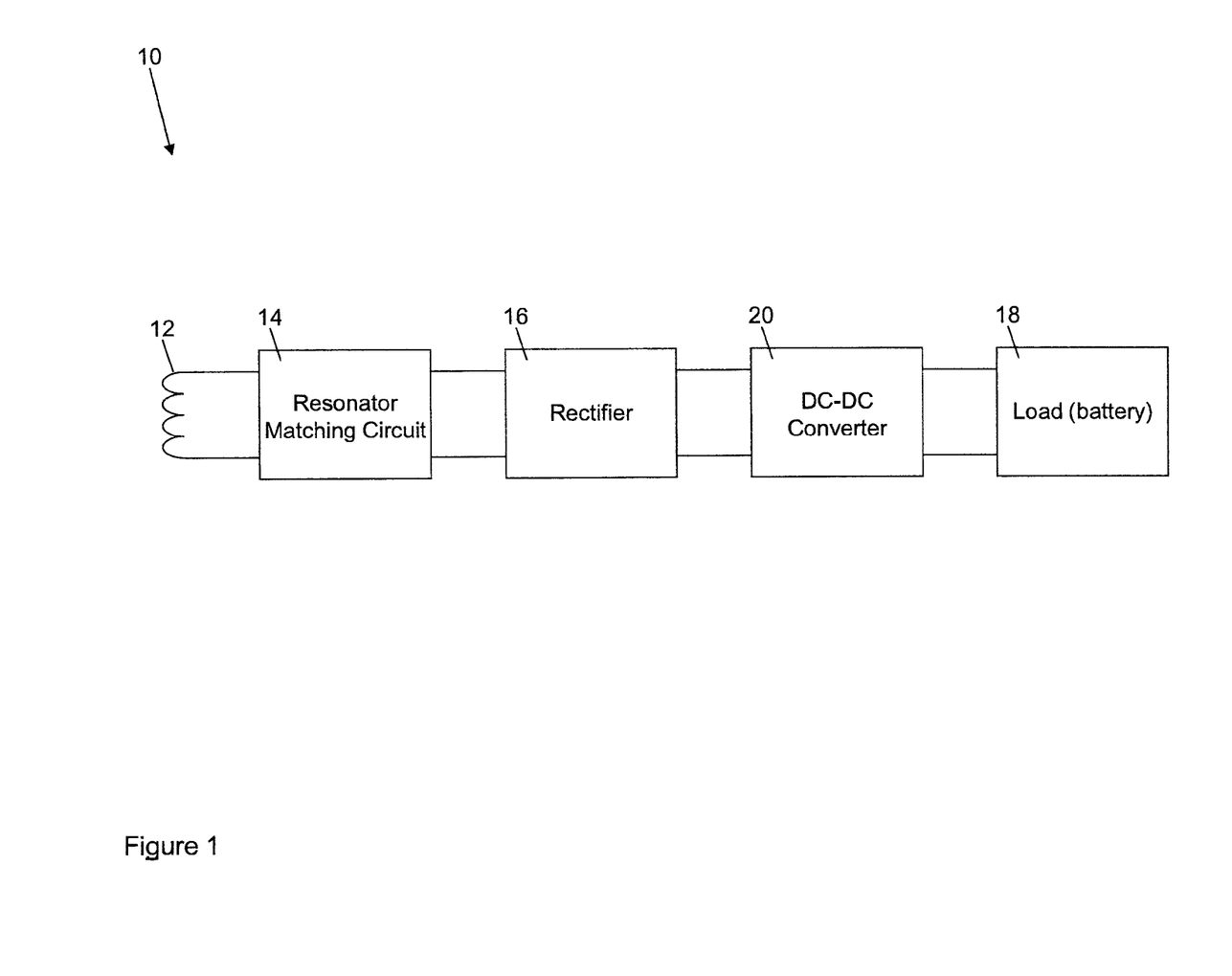
FIG. 1 is a schematic representation of a typical architecture for wireless charging of a battery in a device.

Referring first to FIG. 1, an architecture for wireless charging of a rechargeable battery of a device is shown generally at 10. For the sake of clarity and brevity only those functional blocks of the architecture that are relevant to the function of charging a battery are shown in FIG. 1, but it will be appreciated that a device containing a rechargeable battery will include additional functional blocks that are unrelated to the wireless charging functionality.

The architecture 10 includes a charging resonator assembly 12, which may be an inductance formed from one or more loops of a conductive material. For example, the charging resonator assembly 12 may be formed from a loop of conductive material such as copper printed, etched or otherwise provided on a substrate such as a printed circuit board. When the device is within an external alternating magnetic field generated by a wireless charger, the charging resonator assembly 12 converts energy from the alternating magnetic field into an alternating electric current.

First and second terminals of the charging resonator assembly 12 are connected to input terminals of a resonator matching circuit 14. The resonator matching circuit 14 includes a resonant network which is configured to set the resonant frequency of the charging resonator 12 to a desired value, to achieve optimum transfer of energy from the time varying magnetic field.

Output terminals of the resonator matching circuit 14 are connected to input terminals of a rectifier 16, which is operative to convert the alternating current output by the charging resonator 12 into a direct current (DC) that is suitable for driving a load, in this case charging a battery 18 of the device. A DC-DC converter 20 may be provided to convert the DC output of the rectifier 16 to a level that is more suitable for charging the battery 18. Thus, the resonator matching circuit 14, rectifier 16 and DC-DC converter 20 form a charging circuit for charging the battery 18 of the device from the current induced in the charging resonator assembly 12.

Figure 2:
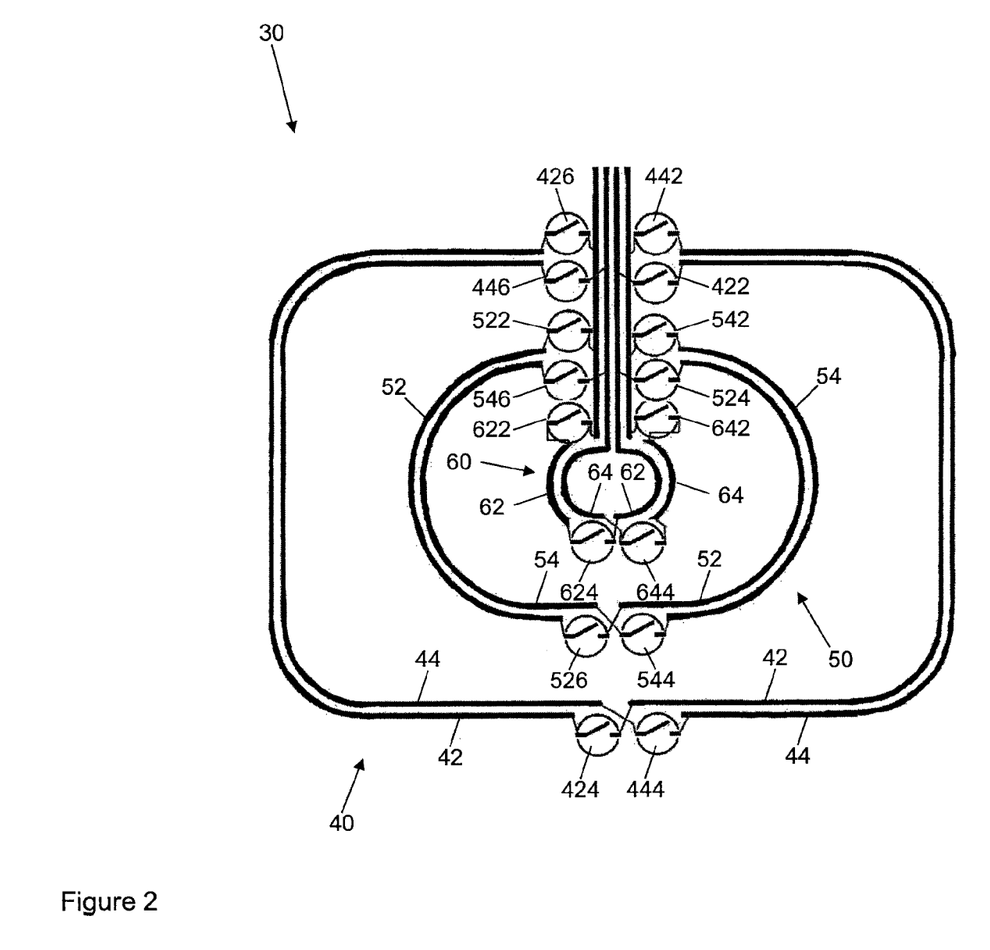
FIG. 2 is a schematic representation of a charging resonator assembly for use in a wireless charging architecture of a device.

FIG. 2 is a schematic representation of a charging resonator assembly for use in a wireless charging apparatus. The charging resonator assembly, shown generally at 30, includes outer, intermediate and inner resonators 40, 50, 60. Thus, the charging resonator assembly 30 includes three resonators of different sizes and therefore different impedances. This permits the charging resonator assembly 30 to couple efficiently with charging antennas of different sizes in a wireless charger. Thus, a device incorporating the charging resonator assembly 30 illustrated in FIG. 2 can be wirelessly charged by a variety of different wireless chargers.

As can be seen from FIG. 2, the outer resonator 40 is formed as a loop comprising first and second turns 42, 44, whilst the intermediate resonator 50 is formed as a loop comprising first and second turns 52, 54 and the inner resonator 60 is formed as a loop comprising first and second turns 62, 64. However, it will be appreciated that alternative resonator configurations may be used. For example, one or more of the outer, intermediate and inner resonators 40, 50, 60, may be formed from only a single turn, or may be formed from more than two turns.

The first turn 42 of the outer resonator 40 includes first, second and third microelectomechanical system (MEMS) switches 422, 424, 426. When the first, second and third switches 422, 424, 426 are all in an open position, the first turn 42 of the outer resonator 40 is divided into two electrically unconnected portions. When the first, second and third switches 422, 424, 426 are all in a closed position, the two portions of the first turn 42 of the outer resonator 40 are electrically connected, forming a single electrically continuous turn.

The second turn 44 of the outer resonator 40 also includes first, second and third microelectromechanical system (MEMS) switches 442, 444, 446. When the first, second and third switches 442, 444, 446 are all in an open position, the second turn 44 of the outer resonator 40 is divided into two electrically unconnected portions. When the first, second and third switches 442, 444, 446 are all in a closed position, the two portions of the second turn 44 of the outer resonator 40 are electrically connected, forming a single electrically continuous turn.

Similarly, the first turn 52 of the intermediate resonator 50 includes first, second and third microelectromechanical system (MEMS) switches 522, 524, 526. When the first, second and third switches 522, 524, 526 are all in an open position, the first turn 52 of the intermediate resonator 50 is divided into two electrically unconnected portions. When the first, second and third switches 522, 524, 526 are all in a closed position, the two portions of the first turn 52 of the intermediate resonator 50 are electrically connected, forming a single electrically continuous turn.

The second turn 54 of the intermediate resonator 50 also includes first, second and third microelectromechanical system (MEMS) switches 542, 544, 546. When the first, second and third switches 542, 544, 546 are all in an open position, the second turn 54 of the intermediate resonator 50 is divided into two electrically unconnected portions. When the first, second and third switches 542, 544, 546 are all in a closed position, the two portions of the second turn 54 of the intermediate resonator 50 are electrically connected, forming a single electrically continuous turn.

The first turn 62 of the inner resonator 60 includes first and second microelectomechanical system (MEMS) switches 622, 624. When the first and second switches 622, 624 are both in an open position, the first turn 62 of the inner resonator 60 is divided into two electrically unconnected portions. When the first and second switches 622, 624 are both in a closed position, the two portions of the first turn 62 of the inner resonator 60 are electrically connected, forming a single electrically continuous turn.

The second turn 64 of the inner resonator 60 also includes first and second microelectomechanical system (MEMS) switches 642, 644. When the first and second switches 642, 644 are both in an open position, the second turn 64 of the inner resonator 60 is divided into two electrically unconnected portions. When the first and second switches 642, 644 are both in a closed position, the two portions of the second turn 64 of the inner resonator 60 are electrically connected, forming a single electrically continuous turn.

The MEMS switches 422, 424, 426, 442, 444, 446 of the outer resonator 40 serve two purposes.

The first is to permit the connection of the outer resonator 40 to the resonator matching circuit 14. Thus, when all of the MEMS switches 422, 424, 426, 442, 444, 446 of the outer resonator 40 are in the closed position a current path exists from the outer resonator 40 to the resonator matching circuit 14. In this manner, the MEMS switches 422, 424, 426, 442, 444, 446 of the outer resonator 40 permit the selection of the outer resonator 40 as the charging resonator 12 for the device to be charged.

The second purpose of the MEMS switches 422, 424, 426, 442, 444, 446 is to divide the outer resonator 40 into a plurality of electrically unconnected portions when the outer resonator 40 is not selected as the charging resonator 12 for the device to be charged. Thus, when all of the MEMS switches 422, 424, 426, 442, 444, 446 are in their open position, not only is the outer resonator 40 electrically disconnected from the resonator matching circuit 14, but also the outer resonator is divided into a plurality of electrically disconnected portions.

This fragmentation of the outer resonator 40 into electrically disconnected portions ensures that in the event that the outer resonator 40 remains within a changing magnetic field generated by a wireless charger when the outer resonator 40 has been disconnected, e.g. because a risk condition such as overcharging or excessive charging voltage has been detected, the current induced in any one of the portions of the outer resonator 40, and any resulting voltage, is of a magnitude that can be safely handled by the MEMS switches 422, 424, 426, 442, 444, 446. MEMS switches can typically tolerate much greater currents and voltages than ordinary transistors, and are less costly than high power transistors, making them ideal for use in this application.

The MEMS switches 522, 524, 526, 542, 544, 546 of the intermediate resonator 50 perform a similar dual role, of selectively connecting the intermediate resonator 50 to the resonator matching circuit 14, and also of dividing the intermediate resonator 50 into a plurality of electrically disconnected portions to reduce the current induced in any one of the portions as a result of the presence of the intermediate resonator 50 within a changing magnetic field when the intermediate resonator 50 is disconnected from the resonator matching circuit 14, and any resulting voltage, to a magnitude that can be safely handled by the MEMS switches 522, 524, 526, 542, 544, 546.

Likewise, the MEMS switches 622, 624, 642, 644 of the inner resonator 60 perform a dual role, of selectively connecting the inner resonator 60 to the resonator matching circuit 14, and also of dividing the inner resonator 60 into a plurality of electrically disconnected portions to reduce the current induced in any one of the portions as a result of the presence of the inner resonator 60 within a changing magnetic field when the inner resonator 60 is disconnected from the resonator matching circuit 14, and any resulting voltage, to a magnitude that can be safely handled by the MEMS switches 622, 624, 642, 644.

It will be appreciated that in most circumstances only one of the outer, intermediate and inner resonators 40, 50, 60 of the charging resonator assembly 30 will be selected at any one time, to ensure that the resonator 40, 50, 60 that is best matched to an active charging resonator of a wireless charger is selected.

Thus, if the outer resonator 40 is selected, for example, the MEMS switches 422, 424, 426, 442, 444, 446 of the outer resonator 40 will be in their closed position, whilst the MEMS switches 522, 524, 526, 542, 544, 546 of the intermediate resonator 50 and the MEMS switches 622, 624, 642, 644 of the inner resonator 60 will be in their open position.

Similarly, if the intermediate resonator 50 is selected, the MEMS switches 522, 524, 526, 542, 544, 546 of the intermediate resonator 50 will be in their closed position, whilst the MEMS switches 422, 424, 426, 442, 444, 446 of the outer resonator 40 and the MEMS switches 622, 624, 642, 644 of the inner resonator 60 will be in their open position.

Likewise, if the inner resonator 60 is selected, the MEMS switches 622, 624, 642, 644 of the inner resonator 60 will be in their closed position, whilst the MEMS switches 422, 424, 426, 442, 444, 446 of the outer resonator 40 and the MEMS switches 522, 524, 526, 542, 544, 546 of the intermediate resonator 50 will be in their open position.

The use of the MEMS switches in the different resonators 30, 40, 50 of the charging resonator assembly 30 also addresses a problem that can arise in multi-resonator assemblys of the type illustrated in FIG. 2.

Where one of the resonators, for example the outer resonator 40 is active and the other two resonators, for example the intermediate and inner resonators 50, 60 are inactive, parasitic coupling may occur in the inactive resonators 50, 60. As a current is induced in the active resonator 40 as a result of a changing external magnetic field, that induced current itself causes a magnetic field to be generated around the active resonator 40. This generated magnetic field can in turn induce currents in the inactive resonators 50, 60.

In the charging resonator assembly 30 of FIG. 2, the problem of currents being induced in the inactive resonators due to such parasitic coupling is reduced by the use of the MEMS switches to divide each of the inactive resonators into a plurality of portions which are electrically unconnected. This ensures that the magnitude of any current induced in the electrically unconnected portions of the inactive resonators as a result of parasitic coupling, and the magnitude of any associated voltage, is small enough to be handled safely by the MEMS switches.

The outer, intermediate and inner resonators 40, 50, 60 are each of a different length, and thus the outer, intermediate and inner resonators 40, 50, 60 each have a different inductance. To ensure optimum transfer of energy from the selected one of the resonators 40, 50, 60 to the rectifier 16, the resonator matching circuit 14 must be reconfigurable to complement the selected resonator 40, 50, 60. This can be achieved through the use of MEMS switches, as will now be explained with reference to FIGS. 3 and 4.

The resonator matching circuit 14 typically comprises a resonant circuit. For example, the resonator matching circuit 14 may comprise a resonant circuit including one or more resistances and one or more capacitances in a series or resonant combination.

Figure 3:
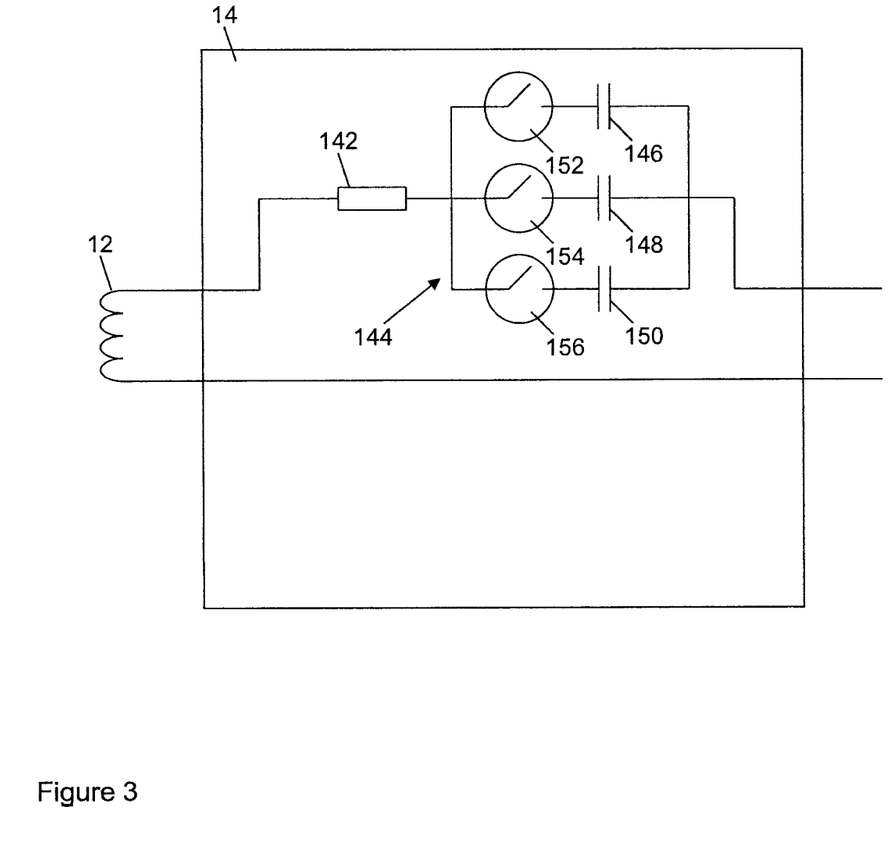
FIG. 3 is a schematic representation of a series resonant circuit for use in a resonator matching circuit.

FIG. 3 is a schematic representation of an exemplary series resonant circuit for use in the resonator matching circuit 14. In this example, the resonator matching circuit 14 includes a resistance 142 connected in series with one terminal of the charging resonator 12, and the resistance is in turn connected in series with a bank 144 of parallel first, second and third capacitances 146, 148, 150, each of which is individually selectable by means of a respective first, second or third MEMS switch 152, 154, 156 connected in series with the capacitance 146, 148, 150. Thus, when the first MEMS switch 152 is in a closed position, the first capacitance 146 is connected in series with the resistance 142, whilst when the second MEMs switch 154 is in the closed position the second capacitance 148 is connected in series with the resistance 142, and when the third MEMS switch 156 is in its closed position the third capacitance 150 is connected in series with the resistance 142. Of course, if two or more of the MEMS switches 152, 154, 156 are in the closed position at the same time, the resistance 142 is connected in series with the parallel combination of the capacitances 146, 148, 150 associated with the MEMS switches that are in the closed position.

Thus, the MEMS switches 152, 154, 156 can be actuated to select the appropriate capacitance 146, 148, 150, or combination of capacitances 146, 118, 150 required to tune the selected one of the resonators 40, 50, 60 of the charging resonator assembly 30 to a desired frequency.

Figure 4:
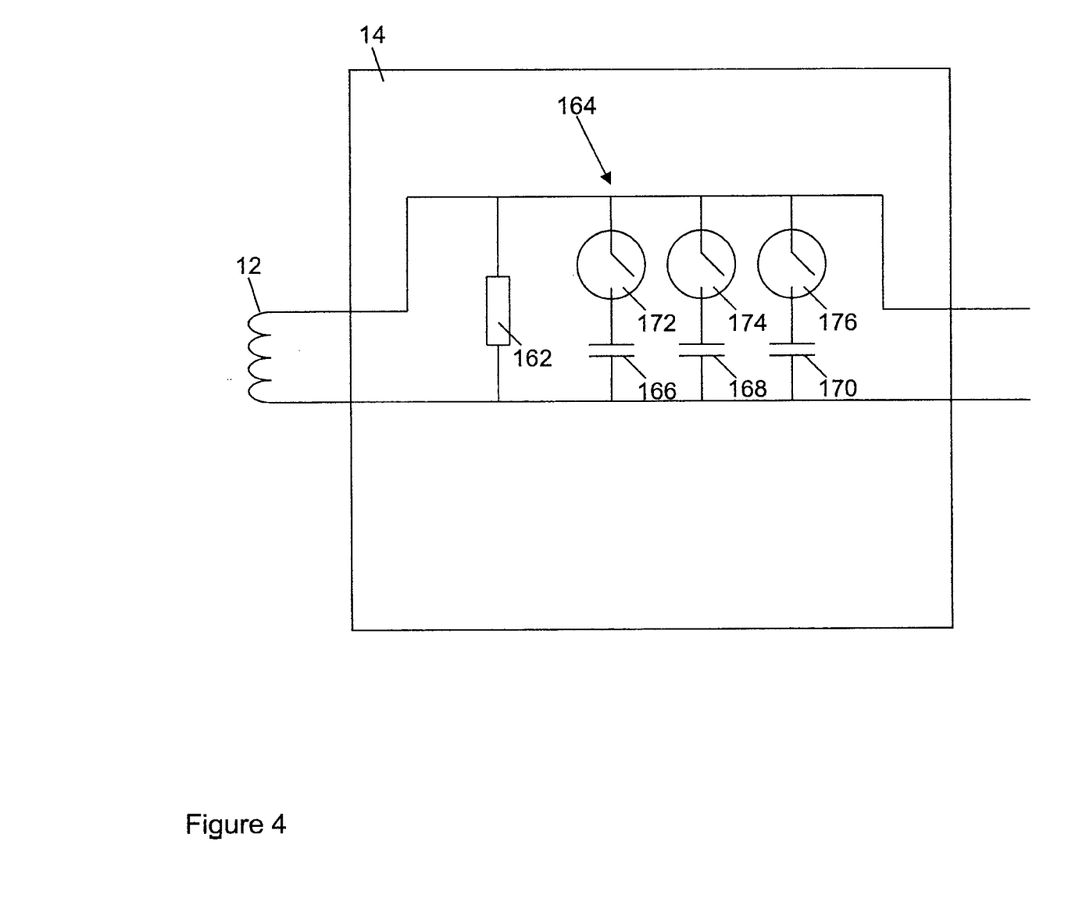
FIG. 4 is a schematic representation of a parallel resonant circuit for use in a resonator matching circuit.

FIG. 4 is a schematic representation of an exemplary parallel resonant circuit for use in the resonator matching circuit 14. In this example, the resonator matching circuit 14 includes a resistance 162 connected in parallel with the terminals of the charging resonator 12. The resistance 162 is in turn connected in parallel with a bank 164 of parallel first, second and third capacitances 166, 168, 172, each of which is individually selectable by means of a respective first, second or third MEMS switch 174, 176, 178 connected in series with the capacitance 168, 170, 172. Thus, when the first MEMS switch 174 is in a closed position, the first capacitance 168 is connected in parallel with the resistance 162, whilst when the second MEMs switch 176 is in the closed position the second capacitance 170 is connected in parallel with the resistance 162, and when the third MEMS switch 178 is in its closed position the third capacitance 172 is connected in series with the resistance 162. Of course, if two or more of the MEMS switches 174, 176, 178 are in the closed position at the same time, the resistance 162 is connected in parallel with the parallel combination of the capacitances 168, 170, 172 associated with the MEMS switches that are in the closed position.

Thus, the MEMS switches 174, 176, 178 can be actuated to select the appropriate capacitance 158, 160, 162, or combination of capacitances 158, 160, 162 required to tune the selected one of the resonators 40, 50, 60 of the charging resonator assembly 30 to a desired frequency.

The length and configuration of an antenna or resonator such as the outer, intermediate or inner resonator 40, 50, 60 of the charging resonator can be set and adjusted dynamically using MEMS switches, as will now be described with reference to FIG. 5.

Figure 5:
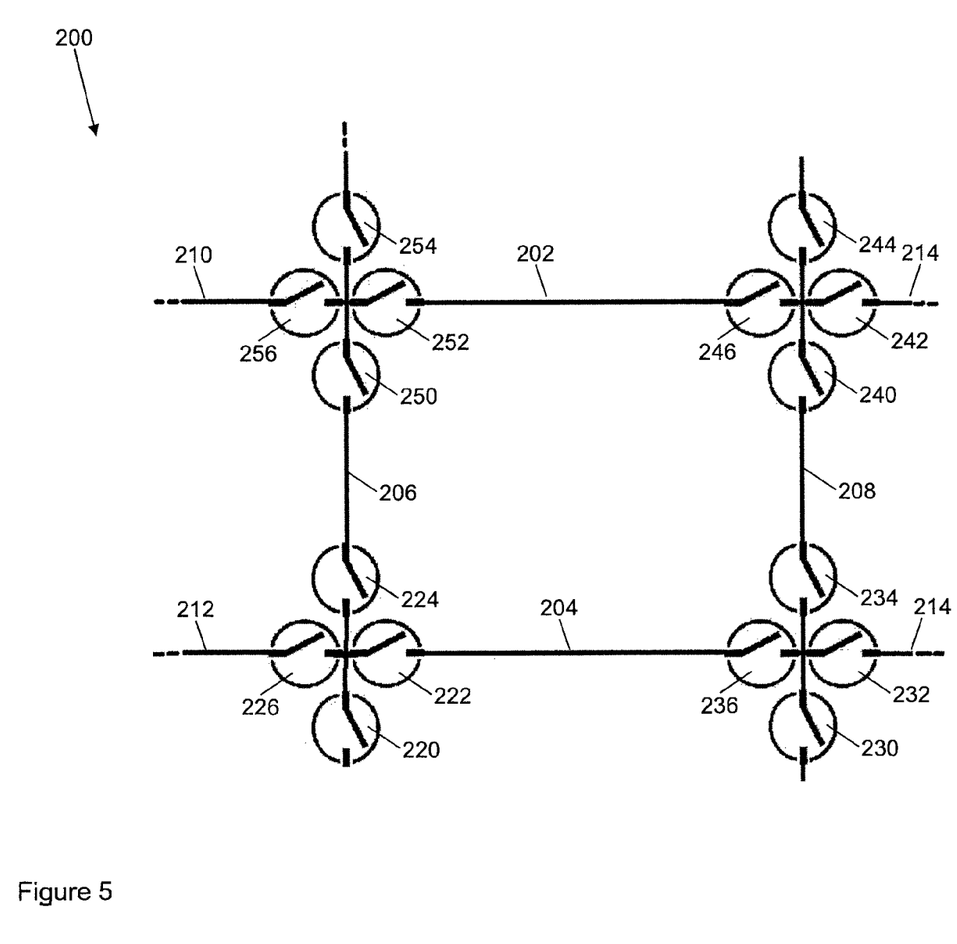
FIG. 5 is a schematic representation of a reconfigurable antenna or resonator

FIG. 5 is a schematic representation of a reconfigurable antenna or resonator. As shown in FIG. 5, the reconfigurable antenna or resonator 200 comprises a plurality of tracks 202, 204, 206, 208, 210, 212 of a conductive material laid out in a grid or matrix configuration. Although in the exemplary embodiment illustrated in FIG. 5 the tracks 202, 204, 206, 208, 210, 212 are laid out in a generally rectangular grid or matrix configuration, it is to be understood that other grid or matrix configurations could equally be used. For example, the tracks may be laid out in any generally polygonal configuration, such as a triangular or hexagonal grid or matrix configuration. The tracks 202, 204, 206, 208, 210, 212 may be, for example, copper tracks printed on a substrate such as a printed circuit board.

The tracks 202, 204, 206, 208, 210, 212 do not intersect each other, and so are electrically isolated from each other. A plurality of MEMS switches 220, 222, 224, 226, 230, 232, 234, 236, 240, 242, 244, 246, 250, 252, 254, 256 are provided, by means of which electrical connections can be made between tracks. For example, by actuating (i.e. closing) the MEMS switches 222, 224, 236, 234, 240, 246, 252 and 250, electrical connections can be made between the tracks 202, 204, 206 and 208, such that the tracks 202, 204, 206 and 208 and the actuated MEMS switches 222, 224, 236, 234, 240, 246, 252 and 250 form a single electrical conductor which is generally square or rectangular in shape, and can be used as an antenna or resonator. Similarly, if the MEMS switches 226, 222, 236 and 232 are actuated (i.e. closed), the tracks 204, 212 and 214 can be electrically connected to form a generally straight antenna or resonator.

Thus, the plurality of MEMS switches 220, 222, 224, 226, 230, 232, 234, 236, 240, 242, 244, 246, 250, 252, 254, 256 permit the antenna or resonator 200 to be configured and reconfigured quickly and easily.

A reconfigurable antenna or resonator 200 of the type illustrated in FIG. 5 could be used in place of the multi-resonator charging resonator assembly 30 to permit use of the architecture 10 with different wireless chargers. In this case, the reconfigurable antenna or resonator 200 would be configured for optimum coupling with an active charging resonator of the wireless charger that is in use by actuating appropriate ones of the plurality of MEMS switches 220, 222, 224, 226, 230, 232, 234, 236, 240, 242, 244, 246, 250, 252, 254, 256.

It will be appreciated from the foregoing that the use of a plurality of MEMS switches in the resonator assembly of the apparatus of the present invention gives rise to a number of advantages over prior art systems. The MEMS switches allow the charging resonator to be detuned or disconnected from the charging circuit safely, as the MEMS switches are able to cope safely with currents induced in the charging resonator when it is disconnected or detuned, thus obviating the need for costly high power transistors. Moreover, the use of the plurality of MEMS switches to divide the charging resonator into a plurality of electrically unconnected resonator portions reduces the amount of current and/or voltage that can be induced in any one individual resonator portion to a level that can be safely managed.

The plurality of MEMS switches in each individual resonator in a multi-resonator assembly helps to reduce the effects of parasitic coupling between the individual resonators of the resonator assembly.

Additionally, in the reconfigurable antenna/resonator described herein, the MEMS switches permit fast and easy configuration or reconfigured of the antenna/resonator to suit different applications or charging conditions.

The invention claimed is:

1. Apparatus for wirelessly charging a rechargeable battery, the apparatus comprising:
a charging resonator assembly for converting energy from a magnetic field external to the apparatus into an electric current; and
a charging circuit for charging the battery using the electric current, wherein the charging resonator assembly includes a plurality of microelectromechanical system (MEMS) switches which, when open, divide the charging resonator into a plurality of electrically unconnected resonator portions, and which, when closed, connect the plurality of resonator portions to form a continuous resonator.

2. Apparatus according to claim 1 wherein the charging resonator assembly includes a plurality of individual resonators, and wherein each resonator includes a plurality of microelectromechanical system (MEMS) switches which, when open, divide the individual resonator into a plurality of electrically unconnected resonator portions, and which, when closed, connect the plurality of resonator portions to form a continuous resonator.

3. Apparatus according to claim 2 wherein one of the plurality of MEMS switches of each individual resonator is operative to selectively connect the individual resonator to the charging circuit.

4. Apparatus for wirelessly charging a rechargeable battery, the apparatus comprising:
   a charging resonator assembly for converting energy from a magnetic field external to the apparatus into an electric current;
   a charging circuit for charging the battery using the electric current, wherein the charging resonator assembly includes a plurality of microelectromechanical system NEMS) switches which, when open, divide the charging resonator into a plurality of electrically unconnected resonator portions, and which, when closed, connect the plurality of resonator portions to form a continuous resonator; and
   a resonator matching circuit configured to tune the charging resonator assembly to a desired frequency, wherein the resonator matching circuit includes a MEMS switch for selectively connecting a tuning component of the resonator matching circuit to tune the charging resonator assembly to the desired frequency.

5. Apparatus according to claim 4 wherein the resonator matching circuit comprises a series resonant circuit including a plurality of MEMS switches for selecting one or more of a plurality of tuning components.

6. Apparatus according to claim 4 wherein the resonator matching circuit comprises a parallel resonant circuit including a plurality of MEMS switches for selecting one or more of a plurality of tuning components.

7. Apparatus according to claim 4 wherein the tuning component comprises a capacitance.

8. Apparatus for wirelessly charging a rechargeable battery, the apparatus comprising:
   a charging resonator assembly for converting energy from a magnetic field external to the apparatus into an electric current; and
   a charging circuit for charging the battery using the electric current, wherein the charging resonator assembly includes a plurality of microelectromechanical system MEMS) switches which, when open, divide the charging resonator into a plurality of electrically unconnected resonator portions, and which, when closed, connect the plurality of resonator portions to form a continuous resonator;
   wherein the charging resonator assembly comprises a reconfigurable resonator, wherein the reconfigurable resonator comprises:
   a plurality of tracks of electrically conductive material, the plurality of tracks being electrically isolated from each other; and
   a plurality of microelectromechanical system (MEMS) switches, wherein individual ones of the plurality of MEMS switches can be actuated to make electrical connections between selected ones of the plurality of tracks, such that the selected tracks and the actuated MEMS switches form a single electrically conductive element.

9. Apparatus according to claim 8 wherein the plurality of tracks are arranged in a grid or matrix configuration.

10. Apparatus according to claim 9 wherein the grid or matrix configuration is generally polygonal.

\* \* \* \* \*